Jan. 21, 1969  A. L. HUBBARD  3,422,751

COTTON HARVESTER

Filed Sept. 7, 1965

*INVENTOR.*
A. L. HUBBARD

BY William A. Murray

ATTORNEY

United States Patent Office 3,422,751
Patented Jan. 21, 1969

3,422,751
COTTON HARVESTER
Arthur L. Hubbard, Des Moines, Iowa, assignor to Deere & Company, Moline, Ill., a corporation of Delaware
Filed Sept. 7, 1965, Ser. No. 485,482
U.S. Cl. 100—233
Int. Cl. B30b 7/00; A01d 45/18; B30b 9/30
4 Claims

ABSTRACT OF THE DISCLOSURE

A cotton receptacle on a cotton harvester having an inlet in one of its sides at the top of the receptacle. An elongated compressor pivotally supported in the receptacle adjacent the inlet and extending therefrom across the receptacle and close to the overhead wall of the receptacle to an opposite end adjacent the opposite side of the receptacle. Power means for raising and lowering the compressor.

---

This invention relates to a cotton harvester. Still more particularly the invention relates to a receptacle for use on a cotton harvester and for a cotton compactor device mounted within the receptacle.

In one of the more conventional type cotton harvesters, there is provided a mobile vehicle having forwardly positioned harevsting units that pick the cotton bolls from cotton plants. Supported on the vehicle in an overhead relation relative thereto is a cotton receptacle that receives cotton from the harvester through a suitable blower system. The blower system has a blower outlet that moves the cotton into the recepacle. The receptacle is composed of a floor, side, and overhead wall structure and has a side inlet for receiving cotton from the blower outlet. The cotton is directed against the overhead which in turn guides it toward the side wall opposite the inlet. When it is desired to discharge the material from the receptacle, the receptacle is tilted and the cotton within the receptacle is moved outwardly into a truck or other type trailer that is available for such operation.

It is desirable to discharge the cotton from the receptacle at one end of the cotton field so that the truck or trailer is not required to pass over the field. Consequently whether the receptacle is completely filled will not normally have any bearing as to the time of discharge since it will be only partially filled at the end of the row or field.

However, in some instances, due to high yield of the cotton plants, or due to an abnormally long length of field, the cotton receptacle will become filled prior to reaching the end of the row. This, of course, creates the problem of requiring discharge of the receptacle or basket in the middle of the field rather than at the end of the field.

Cotton bolls within the receptacle are highly compressible. Therefore, with the above in mind, it is the primary object of the present invention to provide a cotton compressor structure within the receptacle that is utilized for compressing the cotton to permit additional capacity within the receptacle.

Since it is desirable to maintain only the path that the stream of materials issuing from the blower outlet will normally move clear and unobstructed, it is a further object of the invention to provide a compressor that is positioned adjacent the top of the receptacle and one that may be utilized primarily for keeping a channel or groove within the cotton at the top of the receptacle that is directly aligned with the stream of material moving into the receptacle.

Specifically it is the object of the present invention to provide a pair of elongated elements pivoted for vertical movement at one side of the receptacle adjacent and underneath opposite ends of the inlet at that side. The elements extend on opposite sides of the stream of material upwardly and toward the receptacle top to an upper portion that lies closely adjacent the top and extends closely adjacent to the side of the receptacle opposite the material inlet. Power means in the form of hydraulic cylinders are mounted on the top of the receptacle and extend into the receptacle. The rod ends of the hydraulic cylinders are connected to the elongated elements and through extension and retraction of the hydraulic cylinders, the elongated elements are moved vertically for purposes of compressing the cotton.

Other objects and advantages of the present invention will become apparent to those skilled in the art as the nature of the invention is better understood from the following description and as shown in the accompanying drawings.

Figure 1:
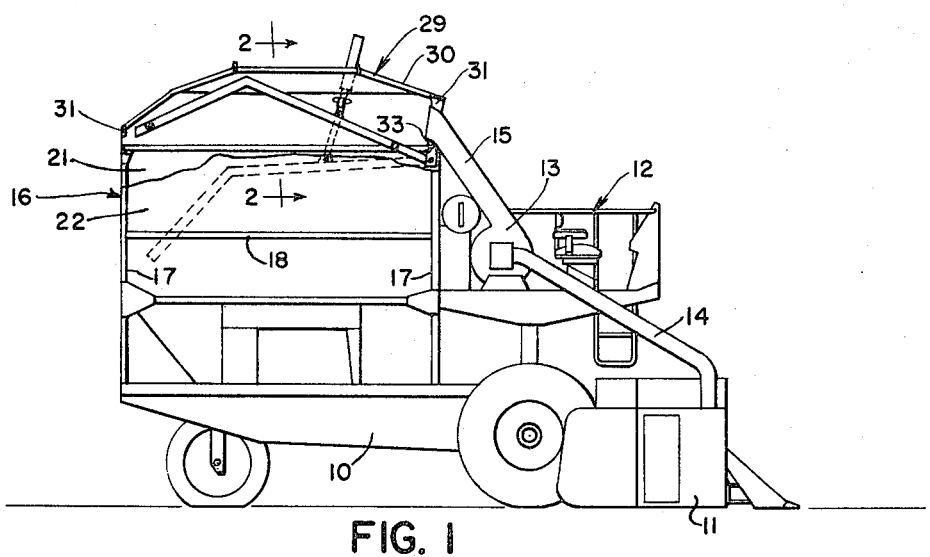
FIG. 1 is a side view of a cotton harvester with portions broken away to show the structure of the present invention.

The cotton harvester includes a main mobile vehicle 10 having forwardly positioned harvesting units 11 supported thereon. An operator's station 12 is also supported on the vehicle 10 at the forward end thereof and above the harvesting units 11. Mounted on the operator's station 12 is a blower 13 having an input conduit 14 extending downwardly and in communication with the harvesting unit and a material discharge conduit 15 that receives the harvested cotton bolls from the blower 13 and discharges them into a cotton basket or receptacle, indicated in its entirety by the reference numeral 16. The basket or receptacle 16 is supported on the vehicle 10 by suitable framework 17 and includes a floor, indicated in its location by floor braces 18, front and rear walls 19 and 20 and opposite side walls 21, 22. The upper edges of the walls 19–22 are provided with a rectangular shaped structural lip 23 that supports an overhead wall or lid 24. The overhead or lid 24 is composed of front and rear upright panel sections 25, 26 that are substantially upper continuations of the front and rear walls 19, 20. The lid also includes inclined panels 27, 28 that extend from the upper edges of the side walls 21, 22 upwardly and inwardly to a central fore-and-aft extending grille structure 29. The grille structure includes a series of parallel fore-and-aft extending metal straps or elements 30 that extend substantially the full fore-and-aft length of the receptacle. The forward ends of the elements 30 are fixed to a metal bar 31 that defines the upper edge of a material inlet 32 in the wall or side extension 25. The inlet 32 is rectangular in shape having a lower horiontal edge as defined by a second horiontal bar 33. The grille 29 has opposite fore-and-aft extending edges defined by a pair of upright side walls 35, 36 connected at their lower edges to the inner parts of the inclined panels 27, 28. As may best be seen in FIG. 1, the discharge conduit 15 has its outlet positioned to drive the cotton bolls upwardly against the lower edges of the grille elements 30 from where they are directed rearwardly and downwardly to the rear side wall 20. The grille 29 will retain the cotton within the receptacle and will permit the trash and accumulation of leaves and other foreign matter picked up in the harvesting operation to pass outwardly and rearwardly of the cotton harvester. The outlet of the blower duct 15 is substantially the width of the grille 29 and the cotton leaving the outlet moves in a stream directed upwardly and rearwardly and is generally retained within the side walls 35, 36.

Figure 2:
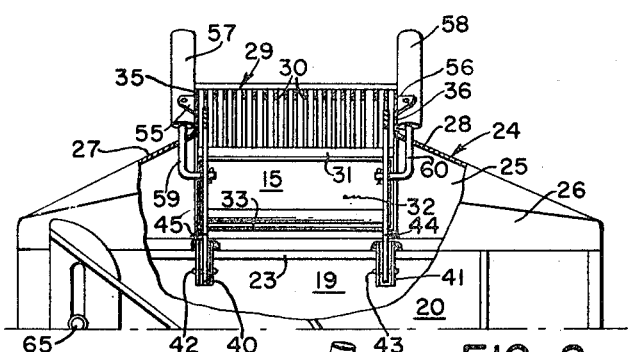
FIG. 2 is a rear view of the top portion of the cotton receptacle with parts thereof in section to show internal mechanism within the receptacle.
Figure 3:
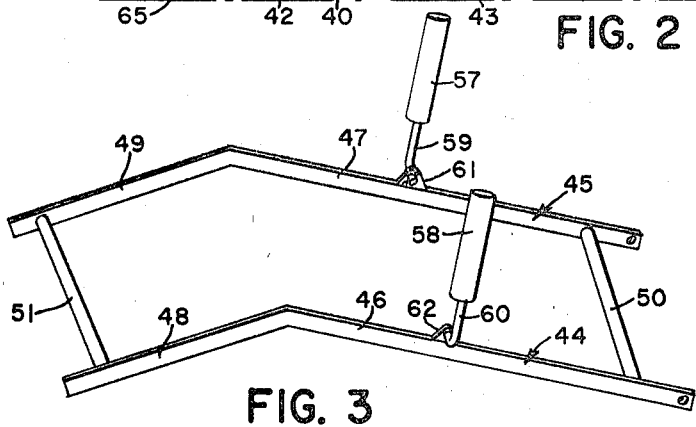
FIG. 3 is a side perspective view of the compressor structure that is mounted in the receptacle.

Depending and rigid with the bar 33 is a pair of transversely spaced hinge brackets 40, 41 that are positioned substantially directly beneath the outer edges of the grille 29 as defined by the upright walls 35, 36. Pivotally connected by hinge pins 42, 43 is a pair of elongated and rearwardly extending compressor elements or bars 44, 45. The bars 44, 45 have upwardly and rearwardly inclined portions 46, 47 that extend from the respective hinge pins 42, 43 to rear portions 48, 49 that lie closely adjacent the rear portion of the grille 29 and extend in a downwardly direction to rear ends positioned closely adjacent the rear side panel 26. As may best be seen from viewing FIG. 2, the rods or elements 44, 45 are positioned on opposite sides of the inlet 32 so that they will not interfere with the normal movement of the material as it moves through the inlet. The bars or elements 44, 45 are interconnected by a pair of rods 50, 51 at their front and rear ends. The transverse rods 50, 51 are so positioned that they will also not interfere with the normal movement of cotton as it moves through the inlet.

Extending outwardly from the respective walls or panels 35, 36 are yokes 55, 56 that pivotally support vertical hydraulic cylinders 57, 58 and extend downwardly through the respective inclined panels 27, 28 and are connected to the compressor element portions 46, 47, the lower ends of the rods 59, 60 being turned inwardly and horizontally to extend through respective ears 61, 62 on the compressor element portions 46, 47.

During normal operation the entire compressor structure, consisting of the elements 44, 45 and rods 50, 51, is held by the hydraulic cylinders 57, 58 in the uppermost position, as shown in FIG. 1. As mentioned, the compressor structure is designed so as to not block the normal flow of materials through the inlet 32. Should the cotton bolls reach the top of the basket or receptacle prior to the time it is desired to discharge the receptacle, the hydraulic cylinders 57, 58 may be operated to move the rods 59, 60 downwardly and the compressor structure will force the cotton bolls to compact toward the base of the receptacle. It should be recognized that there is strong adherence between the individual cotton bolls, and the elements 44, 45, even though relatively widely spaced apart, will be capable of clearing a path or channel directly in line with the normal stream of materials passing through the inlet. Since it is only necessary to clear this channel so that the cotton may move into the basket or receptacle, the compressor structure will suffice to maintain normal flow of cotton into the receptacle.

While only one form of the invention has been shown, it should be recognized that other forms and variations will occur to those skilled in the art. Therefore while the preferred form was shown for the purpose of concisely illustrating the principles of the invention there is no intention to limit or narrow the invention beyond the broad concept set forth in the appended claims.

What is claimed is:

1. For use in a cotton receptacle having overhead, floor, and side walls with an upper side inlet through which cotton is blown in a stream in an upwardly inclined direction toward the overhead wall and a side wall opposite the inlet, and in which the overhead wall has a grille structure in the path of movement of the cotton leaving the inlet, the improvement residing in a cotton compressor structure in the upper portion of the receptacle composed of a pair of elongated elements pivoted for vertical movement at their ends on a receptacle wall adjacent to, beneath, and on opposite sides of the inlet and inclined upwardly from those ends to opposite end portions closely adjacent the overhead wall and adjacent the aforesaid opposite wall, means extending between the elements at said ends and at said opposite end portions for rigidly joining said ends and said end portions and for maintaining an open expanse between the elements in vertical alignment with the grille structure and substantially the width of the grille structure whereby cotton leaving the inlet will be substantially unimpeded in its movement against the grille structure and from the grille structure into the receptacle; and power operated means on the upper portion of the receptacle extending between the overhead wall and the compressor structure for raising and lowering the latter.

2. For use in a cotton receptacle having a floor, side walls, and an overhead wall with a centrally located elongated grille structure having opposite longitudinal edges and composed of a series of parallel elongated and longitudinally extending grille elements, the receptacle having an upper inlet adjacent the overhead wall through which cotton is blown longitudinally of the elongated elements of the grille structure whereby cotton will impinge against the elements and be directed toward the side wall opposite the inlet, the improvement residing in an elongated compressor supported on and within the receptacle adjacent the overhead wall for vertical movement toward and away from the overhead wall, and extending from one end adjacent the inlet toward the side wall opposite the inlet, the compressor being composed of a pair of elongated compressor elements substantially vertically aligned with said opposite edges to thereby provide an open expanse therebetween extending substantially the full width of the grille structure and through which cotton may be blown unimpeded from the inlet to and against the grille structure and therefrom into the receptacle; and means on the upper portion of the receptacle for raising and lowering the compressor structure for compressing cotton in the receptacle beneath the stream in order to maintain an open channel for the stream of material extending from the inlet across the upper portion of the receptacle.

3. The invention defined in claim 2 in which the compressor elements are supported on the receptacle by horizontal pivot means closely adjacent the underside of the inlet and supporting the compressor elements of the compressor for vertical movement toward and away from the grille-like structure.

4. The invention defined in claim 3 in which the elongated compressor elements are composed of end portions opposite the pivot means adapted to closely underlie the grille-like structure adjacent the opposite side wall, and inclined portions extending from the pivot means to the end portions.

References Cited

UNITED STATES PATENTS

| 3,215,291 | 11/1965 | Nickla | 100—233 X |
| 662,057 | 11/1900 | Cowan. | |
| 1,314,437 | 8/1919 | Silverthorne | 56—12 |
| 2,741,888 | 4/1956 | Hamel et al. | 56—12 |
| 2,789,067 | 4/1957 | Link | 15—83 X |

FOREIGN PATENTS

| 216,983 | 6/1924 | Great Britain. |

BILLY J. WILHITE, *Primary Examiner.*

U.S. Cl. X.R.

15—79; 56—12; 100—91, 295